US012008000B2

(12) United States Patent
Shrivatsa Bhargav et al.

(10) Patent No.: US 12,008,000 B2
(45) Date of Patent: Jun. 11, 2024

(54) AUTOMATED FACT CHECKING USING ITERATIVE KNOWLEDGE BASE QUERYING

(71) Applicant: International Business Machines Corporation, Armonk, NY (US)

(72) Inventors: G P Shrivatsa Bhargav, Bengaluru (IN); Saswati Dana, Bangalore (IN); Dinesh Khandelwal, Indore (IN); Dinesh Garg, Beawar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 17/747,463

(22) Filed: May 18, 2022

(65) Prior Publication Data

US 2023/0401213 A1 Dec. 14, 2023

(51) Int. Cl.
*G06F 17/00* (2019.01)
*G06F 16/2455* (2019.01)
*G06N 5/04* (2023.01)

(52) U.S. Cl.
CPC ......... *G06F 16/24553* (2019.01); *G06N 5/04* (2013.01)

(58) Field of Classification Search
CPC ......... G06F 16/24553; G06F 16/24522; G06F 16/3329; G06F 16/9024; G06F 40/30; G06N 5/04; G06N 5/046; G06N 5/022
See application file for complete search history.

(56) References Cited

U.S. PATENT DOCUMENTS

| 8,229,795 | B1 | 7/2012 | Myslinski |
| 8,321,295 | B1 | 11/2012 | Myslinski |
| 9,015,037 | B2 | 4/2015 | Myslinski |

(Continued)

OTHER PUBLICATIONS

Baoxu Shi et al., Fact Checking in Heterogeneous Information Networks. In Proceedings of the 25th International Conference Companion on World Wide Web, International World Wide Web Conferences Steering Committee, 101-102, <https://doi.org/10.1145/2872518.2889354>, (Apr. 2016).*

(Continued)

*Primary Examiner* — Greta L Robinson
(74) *Attorney, Agent, or Firm* — Garg Law Firm, PLLC; Rakesh Garg; Kristofer Haggerty

(57) ABSTRACT

An embodiment includes decomposing a natural language assertion into a natural language question and answer pair that includes an initial question and an initial answer. The embodiment translates the initial question into a structured knowledge graph query and then performs an iterative process comprising iterative querying of a knowledge graph and evaluating of corresponding query responses resulting in respective confidence scores. A first iteration of the iterative process comprises querying of the knowledge graph to retrieve a first predicted answer, then determining whether a degree of similarity between the initial answer and the first predicted answer meets a threshold criterion. If not, the first predicted query is altered and used for querying the knowledge graph in a subsequent iteration of the iterative process. The embodiment also generates an assertion correctness score indicative of a degree of confidence that the assertion is factual using the respective confidence scores.

20 Claims, 10 Drawing Sheets

(56) References Cited

U.S. PATENT DOCUMENTS

| | | | |
|---|---|---|---|
| 9,330,084 | B1 | 5/2016 | Kadambi et al. |
| 9,684,871 | B2 | 6/2017 | Myslinski |
| 10,565,508 | B2 * | 2/2020 | Merdivan ............... G06N 5/04 |
| 10,755,177 | B1 | 8/2020 | Dabney et al. |
| 11,386,902 | B2 * | 7/2022 | Keiter .................... G10L 15/26 |
| 11,704,486 | B2 * | 7/2023 | Wu ......................... G06N 3/045 |
| | | | 704/9 |
| 2012/0278297 | A1 * | 11/2012 | Yin ......................... G06N 20/00 |
| | | | 707/706 |
| 2015/0248624 | A1 | 9/2015 | Myslinski |
| 2016/0078149 | A1 * | 3/2016 | Gaucher ........... G06F 16/90332 |
| | | | 704/235 |
| 2020/0202073 | A1 * | 6/2020 | Ghulati ................ G06F 40/279 |
| 2020/0356604 | A1 * | 11/2020 | Macdougall ........... G06N 20/00 |
| 2021/0191938 | A1 | 6/2021 | Galitsky |

OTHER PUBLICATIONS

Ahmadi et al., Explainable Fact Checking with Probabilistic Answer Set Programming, Proceedings of the Truth and Trust Online (TTO), Jun. 21, 2019.

Kim et al., Fact Checking in Knowledge Graphs by Logical Consistency, Semantic Web Research Center, School of Computing, KAIST, Daejeon, Korea, pp. 1-24, Feb. 14, 2021.

Fullfact, Automated Fact Checking, 2022, https://fullfact.org/about/automated/.

Shi et al., Discriminative Predicate Path Mining for Fact Checking in Knowledge Graphs, Knowledge-Based Systems, vol. 104, pp. 123-133, Apr. 15, 2016.

Shiralkar et al., Finding Streams in Knowledge Graphs to Support Fact Checking, 2017 IEEE International Conference on Data Mining (ICDM), Nov. 18-21, 2017.

Yih et al., Semantic Parsing via Staged Query Graph Generation: Question Answering with Knowledge Base, Proceedings of the 53rd Annual Meeting of the Association for Computational Linguistics and the 7th International Joint Conference on Natural Language Processing, Jul. 26-31, 2015.

Berant et al., Semantic Parsing on Freebase from Question-Answer Pairs, Proceedings of the 2013 Conference on Empirical Methods in Natural Language Processing, pp. 1533-1544, Oct. 18-21, 2013.

Sakor et al., FALCON: An Entity and Relation Linking Framework Over DBpedia, CEUR Workshop Proceedings, vol. 2456, pp. 265-268, 2019.

Surya et al., Automatic Question and Answer Pair Generation, Applied Intelligence, vol. 51, International Journal of Trend in Research and Development (IJTRD), National Conference on Social, Mobile, Analytics And Cloud Services (NCSMAC-2016), Sep. 15-16, 2016.

\* cited by examiner

AUTOMATED FACT CHECKING USING ITERATIVE KNOWLEDGE BASE QUERYING

BACKGROUND

The present invention relates generally to a method, system, and computer program product for data processing. More particularly, the present invention relates to a method, system, and computer program product for automated fact checking using iterative knowledge graph querying.

The present application generally relates to verifying a statement. More particularly, the present application relates to an automated system and method for evaluating whether a statement is true or not automatically by using an artificial intelligent computer.

Fact checking refers to evaluating truthfulness of a statement. Currently, the fact checking is performed with respect to at least one resource. The resource includes, but is not limited to, unstructured information and structured information. Unstructured information includes, but is not limited to a collection of documents, web pages, etc. Structured information includes, but is not limited to tables, databases, ontologies, etc. The truthfulness of a statement is determined with respect to the resource(s) used for the fact checking. The time and resources needed to conduct the fact checking is large, e.g., 80 full-time workers to perform only the fact checking of newspaper articles before publishing newspaper articles. However, due to the manual operation of the fact checking, the current fact checking method (e.g., manually contacting an expert in the area of the statement) is error prone. For example, daily newspapers always publish corrections of prior newspaper publications.

SUMMARY

The illustrative embodiments provide for automated fact checking using iterative knowledge graph querying. An embodiment includes decomposing a natural language assertion into a natural language question and answer pair, the natural language question and answer pair comprising an initial question and an initial answer. The embodiment also includes translating the initial question into a structured knowledge graph query. The embodiment also includes performing an iterative process comprising iterative querying of a knowledge graph and evaluating of corresponding query responses resulting in respective confidence scores, where a first iteration of the iterative process comprises querying of the knowledge graph by executing, as a first predicted query, the structured knowledge graph query to retrieve a first predicted answer as a query response from the knowledge graph. The first iteration of the iterative process also includes determining whether a first confidence score of the respective confidence scores meets a threshold criterion, where the first confidence score is indicative of a degree of similarity between the initial answer and the first predicted answer. The first iteration of the iterative process also includes altering, responsive to the first confidence score failing to meet the threshold criterion, the first predicted query based on a difference between the initial answer and the first predicted answer, where the altering results in an altered predicted query. The embodiment also includes that subsequent iterations of the iterative process comprise querying of the knowledge graph using respective altered predicted queries. The embodiment also includes generating an assertion correctness score using the respective confidence scores, where the assertion correctness score is indicative of a degree of confidence that the assertion is factual. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
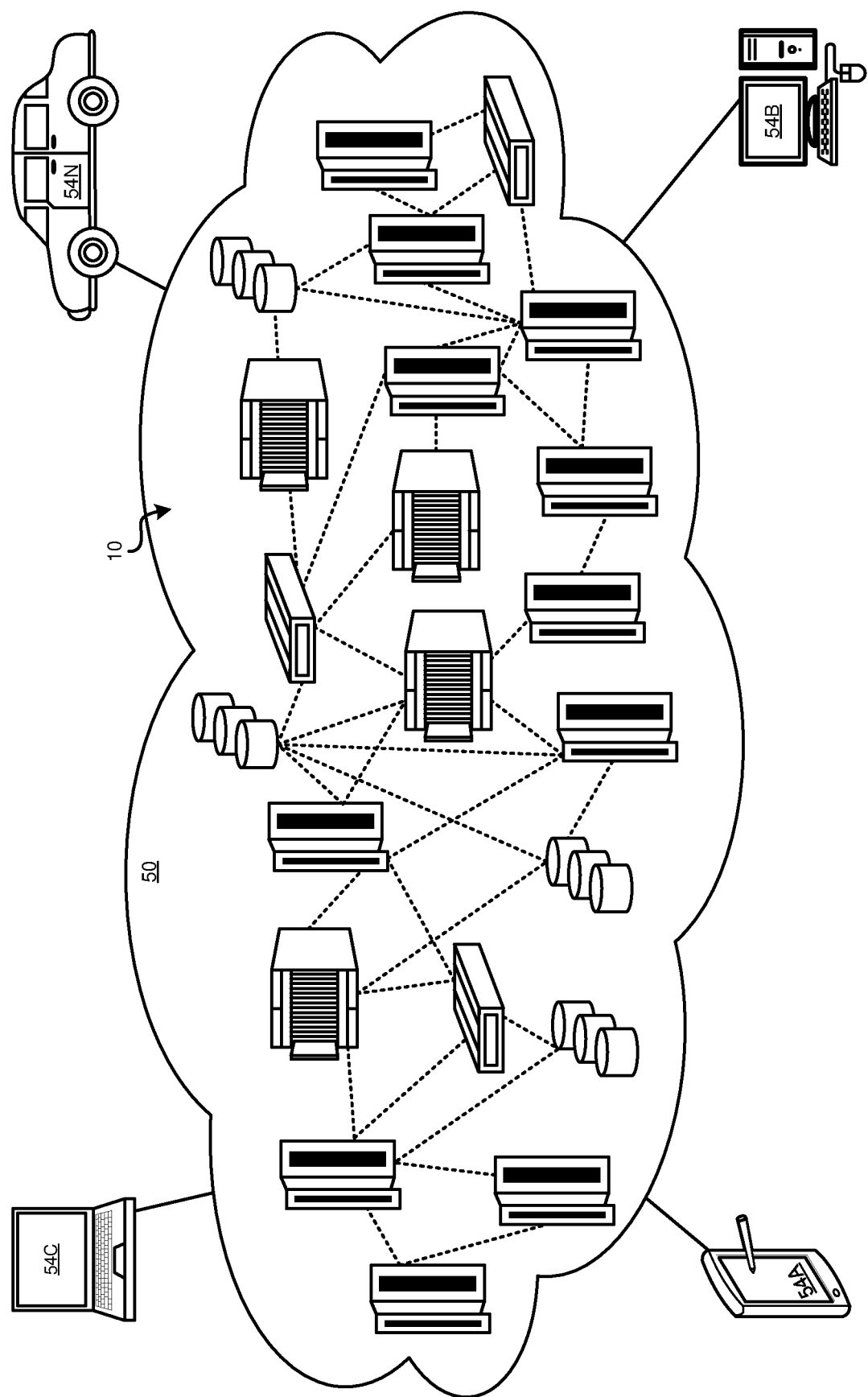
FIG. 1 depicts a cloud computing environment according to an embodiment of the present invention.

Fact-checking is a growing field that involves determining the accuracy of a claim (also referred to herein as an assertion). In some respects, this growing interest can be linked to the ever-expanding user-base and applications of online social media platforms. Social media has evolved over the years from simple online message board and chat applications to today's expansive platforms that allow news to quickly spread to many people at an unprecedented pace. Since this is equally true regardless of whether there is any factual basis for the news, there is an increasing demand for reliable fact-checking services or systems that can keep pace with the torrential influx of information.

Fact-checking has been done manually in the past in which a person or team of people search for evidence to establish whether a claim is true or false. However, manual fact-checking can often be a very time-consuming process and is susceptible to human error. The results of manual fact-checking can lag far behind the spread of false claims, making it difficult for such manual processes to debunk the claims in time to prevent their negative effects. As a result, there has been considerable research into automating fact-checking processes that can provide fast and accurate results. However, existing approaches face significant challenges, such as trying to parse and understand complex claims.

Aspects of the present disclosure address the deficiencies described above by providing mechanisms (e.g., systems, methods, machine-readable media, etc.) that perform automated fact-checking processes that require little or no human intervention. Illustrative embodiments determine whether a claim is correct or incorrect using a knowledge base of curated knowledge organized in the form of a knowledge graph. Some such embodiments decompose a natural language claim under evaluation into a natural language question and a natural language answer, where the natural language answer is used as an initial answer. Some such embodiments then translate the question portion into a knowledge graph query and issue the query to the knowledge graph. In some such embodiments, the automated process then determines a correctness score for the claim based on a comparison of the query result and the initial answer that was decomposed from the original claim.

In some embodiments, an automated fact-checking process receives a claim for evaluation as a document data object of an electronic document. In some such embodiments, the document data object is a natural language text data object comprising a portion of natural language textual content of the electronic document. In some embodiments, the automated fact-checking process parses the natural language claim into a natural language question and a natural language answer.

In some embodiments, the automated fact-checking process parses the natural language question using a semantic parsing procedure that transforms the question into a Meaning Representation Language (MRL). Abstract Meaning Representation (AMR) is an example of an MRL used in some embodiments. AMR is a parsing mechanism for multi-layered semantic interpretation, abstracted representation, and a unified, simple data structure. AMR formalizes full sentence semantics and is particularly devised for canonicalizing language and representing its meaning. It is equipped with a large-scale repository of domain-general annotation of English sentence semantics. AMR expresses the meaning of a sentence in a graph, where nodes represent concepts (e.g., events, entities, or attributes), and edges represent relations (e.g., part-of, agent-of, or location-of). The semantic relations encoded in AMR graphs can be interpreted as a conjunction of logical propositions or triples. AMR graphs are rooted, directed, acyclic, edge-labeled, leaf-labeled graphs that are designed to be interpreted by computer-implemented processes.

In some embodiments, an automated fact-checking process queries a knowledge graph using structured queries in any of many known query languages. SPARQL (Simple Protocol and RDF (Resource Description Framework) Query Language) is an example of a query language that can be used in disclosed embodiments. In some embodiments, a SPARQL query contains a triple that represents steps or antecedents required for obtaining the answer. In some embodiments, as the automated process is fact-checking a claim, the process maintains a textual log of the query or queries involved in fact-checking a claim. This enables a user to review the queries, which provide a form of an explanation as to how the process arrived at an outputted correctness score.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited u-ser-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
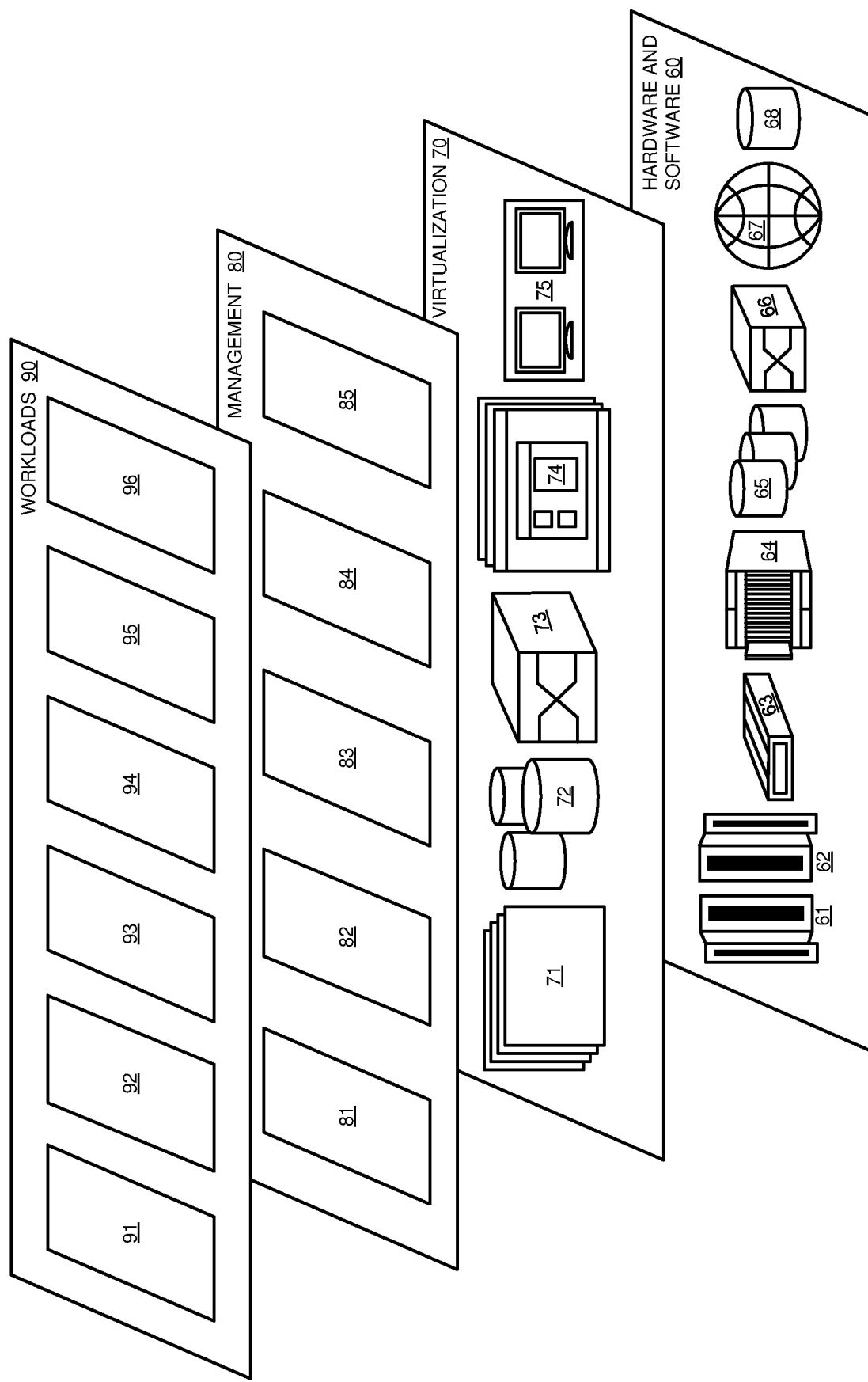
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for automated fact-checking. In addition, workloads, and functions 96 for automated fact-checking may include such operations as data analysis and machine learning (e.g., artificial intelligence, natural language processing, etc.), as described herein. In some embodiments, the workloads, and functions 96 for automated fact-checking also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
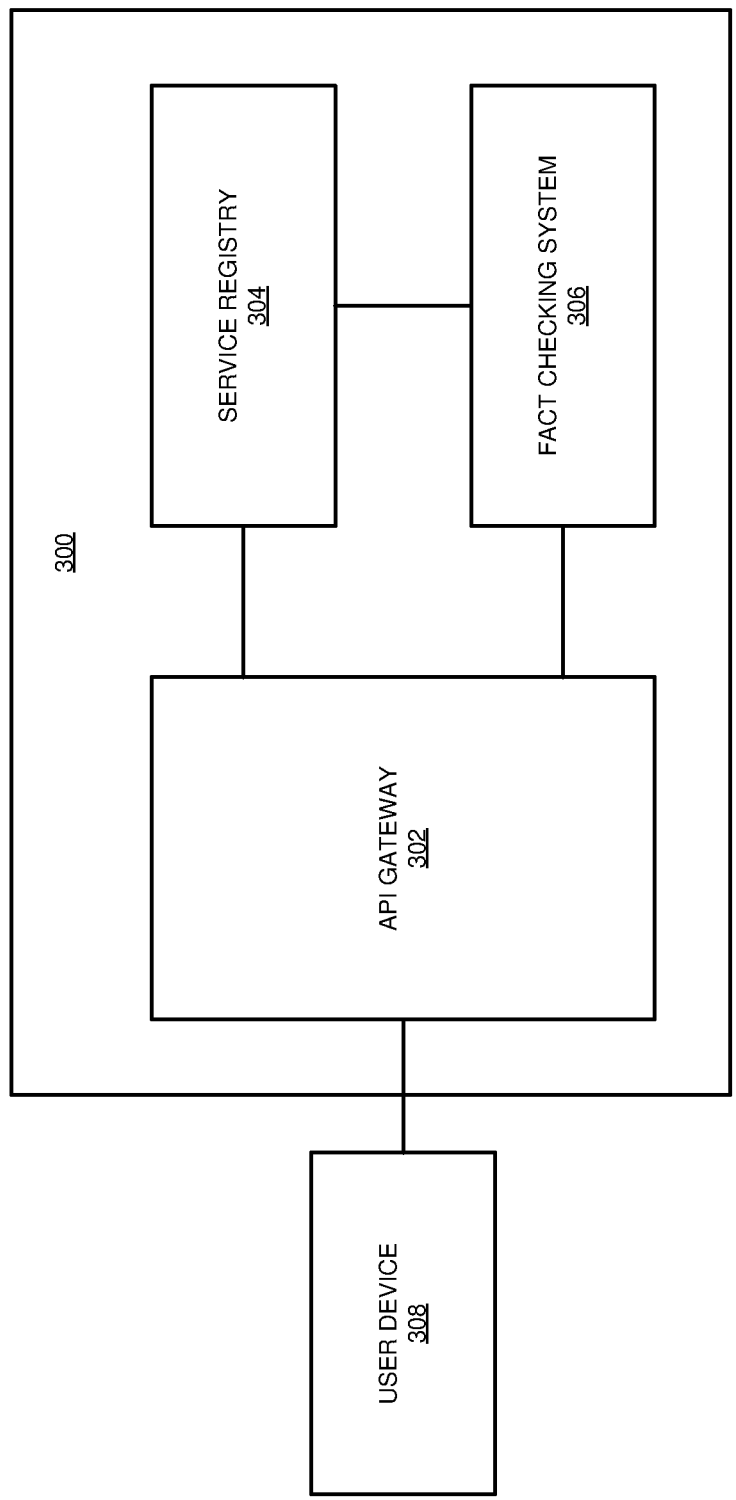
FIG. 3 depicts a block diagram of an example service infrastructure that includes a fact checking system in accordance with an illustrative embodiment.

With reference to FIG. 3, this figure depicts a block diagram of an example service infrastructure 300 that includes a fact checking system 306 in accordance with an illustrative embodiment. In some embodiments, the fact checking system 306 is deployed in workloads layer 90 of FIG. 2. By way of example, in some embodiments, fact checking system 306 is implemented as workloads and functions 96 for cognitive recognition and reproduction of structure graphs in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated fact checking system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like fact checking system 306. API gateway 302 receives service requests issued by client applications and creates service lookup requests based on service requests. As a non-limiting example, in an embodiment, the user device 308 includes a graphical user interface that allows a user to input a claim to be evaluated by the fact checking system 306 and view the results of the fact-checking analysis.

In the illustrated embodiment, service infrastructure 300 includes a service registry 304. In some embodiments, service registry 304 looks up service instances of fact checking system 306 in response to a service lookup request such as one from API gateway 302 in response to a service request from user device 308. For example, in some embodiments, the service registry 304 looks up service instances of fact checking system 306 in response to requests from the user device 308 related to detecting a user input, via the graphical user interface, of a claim or of a location (e.g., input as a Uniform Resource Identifier (URI)) of content containing one or more claims to be evaluated by the fact checking system 306.

In some embodiments, the service infrastructure 300 includes one or more instances of the fact checking system 306. In some such embodiments, each of the multiple instances of the fact checking system 306 run independently on multiple computing systems. In some such embodiments, fact checking system 306, as well as other service instances of fact checking system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics and selects top-ranking service instances for fact checking-related requests. In some such embodiments, in the event that a service instance becomes unresponsive or, unhealthy, the service registry will no longer provide its address or information about this service instance to other services.

Figure 4:
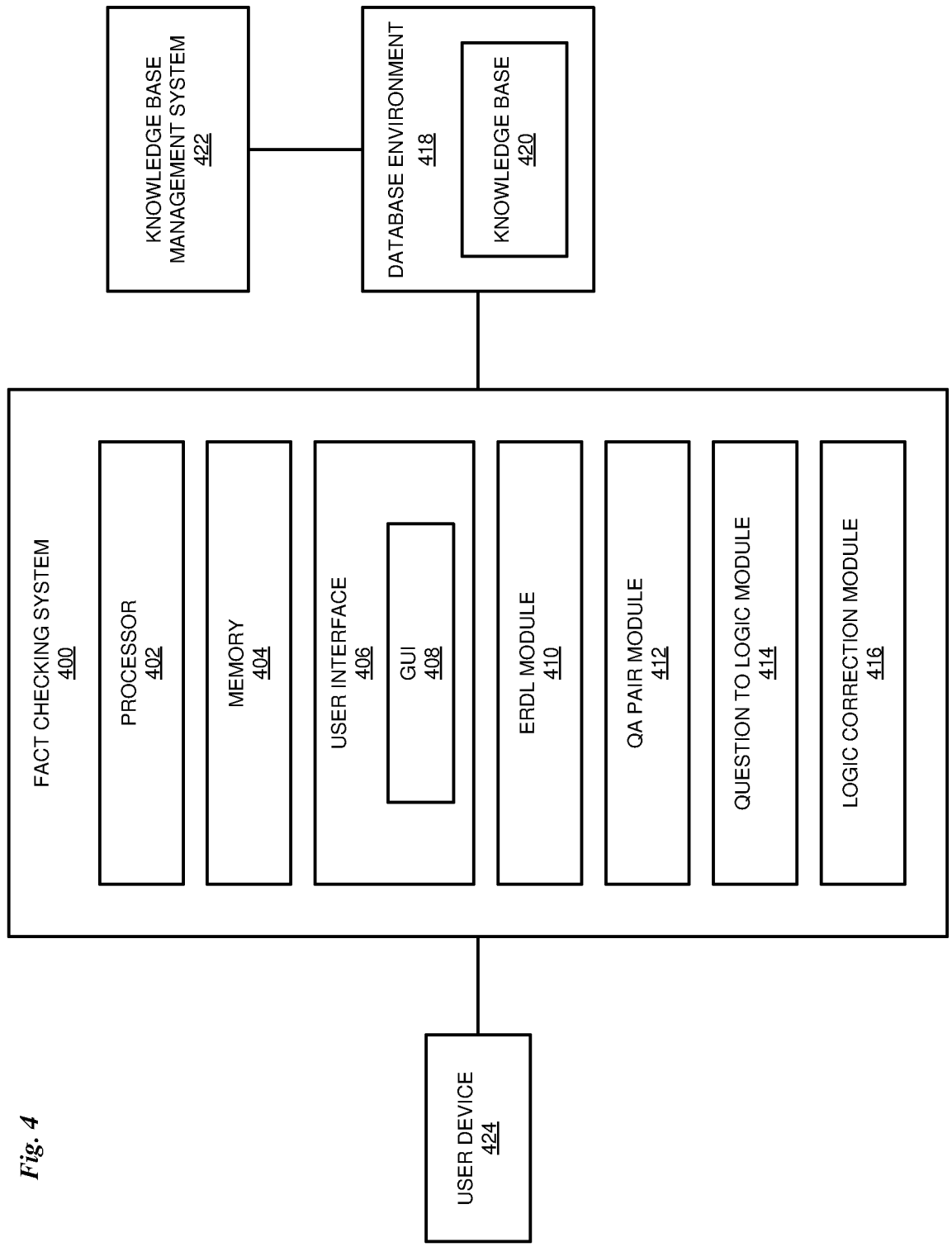
FIG. 4 depicts a block diagram of an example fact checking system in accordance with an illustrative embodiment.

With reference to FIG. 4, this figure depicts a block diagram of an example fact checking system 400 in accordance with an illustrative embodiment. In a particular embodiment, the fact checking system 400 is an example of the workloads and functions 96 for automated fact-checking of FIG. 1.

In some embodiments, the fact checking system 400 includes a processor 402, memory 404, a user interface 406 that includes a graphical user interface (GUI) 408, an Entity and Relation Detection and Linking (ERDL) module 410, a Question and Answer (QA) pair module 412, a question to logic module 414, and a logic correction module 416. In alternative embodiments, the fact checking system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the processing unit ("processor") 402 performs various computational and data processing tasks, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

The user interface 406, which includes a GUI 408 and may further include a command line interface, allows a user to communicate with the fact checking system 400 via the user device 424. For example, in some embodiments, the user interface 406 is configured to recognize and take action in response to requests from the user device 424 related to detecting a user input, via the GUI 408, of one or more claims or of a location of one or more claims for automated fact checking by the fact checking system 400. In some embodiments, a user device 424 may be any known type of computing device, such as a computer, tablet, or smart phone. In some embodiments, the user interface 406 allows communication with the user device 424 via an API gateway (e.g., API gateway 302 of FIG. 3). In some embodiments, the user interface 406 receives one or more user instructions, user settings, user preferences, and/or other user inputs for the fact checking system 400.

In the illustrated embodiment, the logic correction module 416 uses the user interface 406 to render or otherwise provide fact-checking results to the user device 424. In some embodiments, the logic correction module 416 includes an explanation of the fact-checking results to the user device 424 via the user interface 406. In some such embodiments, the explanation includes one or more queries of a knowledge graph included in the knowledge base 420 that were made during the fact-checking process, and in some embodiments further includes responses by the knowledge base 420 to the one or more queries.

The input to the automatic fact checking system 800 is a natural language assertion, for example as a document data object of an electronic document. In some such embodiments, the document data object is a natural language text data object comprising a portion of natural language textual content of the electronic document.

In the illustrated embodiment, the user device 424 transmits a natural language assertion that is first processed by the ERDL module 410. In some embodiments, the assertion is first parsed using an Abstract Meaning Representation (AMR) parser to identify concepts and relationships between the concepts. The ERDL module 410 then performs Entity Extraction and Linking and Relationship Extraction and Linking in order to capture entities and frames (relationships) from the AMR that may not be mapped/linked to corresponding structures in the knowledge base 420. The Entity Extraction and Linking of the ERDL module 410 is configured to extract the entities and relationships to enrich the semantic representation obtained via AMR parsing with explicit links to entities and concepts that appear in the knowledge base 420. The Relationship Extraction and Linking of the ERDL module 410 links those entities and relationships to the knowledge base 420. The linked entities and relationships are then mapped to their corresponding nodes in AMR. The output of the ERDL module 410 is an Extended AMR graph that (E-AMR) that has both entities and relationships linked to the knowledge base 420.

In the illustrated embodiment, the AMR graph is next modified by the QA pair generation module 412 into a natural language question and a natural language answer. The QA pair generation module 412 first modifies the AMR graph of the assertion to isolate a concept and replace the other(s) with an "amr-unknown" as is used for the unknown answer when generating an AMR graph for a question. The modified AMR graph can then be translated into a question from the AMR graph. For example, beginning with the assertion "Dan Gauthier, Nichelle Nichols, Tom Towles, Walter Koenig, Rickey Medlocke, and Amy Acker have acted in movies directed by William Shatner," an AMR graph includes nodes for Dan Gauthier, Nichelle Nichols, Tom Towles, Walter Koenig, Rickey Medlocke, Amy Acker, movies, and William Shatner. The AMR graph is then modified to replace Dan Gauthier, Nichelle Nichols, Tom Towles, Walter Koenig, Rickey Medlocke, and Amy Acker with "amr-unknown." The resulting modified AMR graph can then be converted to a question such as "Q: Who all are the actors starring in movies directed by William Shatner?" Then, the removed nodes become an initial answer "A: Dan Gauthier, Nichelle Nichols, Tom Towles, Walter Koenig Rickey Medlocke, Amy Acker." The question is output to the question-to-logic module 414. The answer is output to the logic correction module 416 for use as an initial answer as described below.

The question to logic module 414 then transforms the question to a logical expression $\hat{L}$. In some embodiments, the logical expression $\hat{L}$ is a SPARQL query. For example, the example question from can result in the following SPARQL query:

```
SELECT DISTINCT ?p
WHERE
{ ?m dbo:director res:William_Shatner
  ?m dbo:starring ?p
}
```

In an embodiment, the question to logic module 414 uses a rule-based transformation from AMR to logic. In an implementation, the following issues are addressed: 1) identifying the target (unbound) variable of a query, 2) identifying queries that require sorting sets of variable bindings, and 3) resolving KB entity URIs to AMR variables.

AMR representations for interrogative and imperative statements are used to identify target variables. In AMR, interrogative statements are represented with nodes that belong to an amr-unknown class. Intuitively, if a question were translated into a fill-in-the-blank sentence, the blank would be represented with an instance of the amr-unknown class. In such cases, the question to logic module 414 replaces amr-unknown nodes (or neighboring nodes) with unbound variables. For imperative statements, the AMR to logic translator replaces the direct object role (ARG1) of the top-level command with an unbound variable.

Questions that require sorting can be detected by the presence of superlatives (i.e., AMR most and least classes) and quantity Propbank frames (i.e., have-quant-91, have-degree-91). The question to logic module 414 must determine the AMR variable that corresponds to the quantity of interest and sorting direction (ascending for "least" and descending for "most"). Entity and relation linking results are essential inputs to the question to logic module 414 because they provide the required KB-specific vocabulary. However, even with accurate entity and relation linking results, there may be differences in the granularity of entities and relations in the KB and AMR representation. For instance, an acceptable AMR parse for "the composer of the soundtrack for Titanic" might not have an edge that directly connects "composer" to "Titanic," but rather a two-edge path between them that passes through "soundtrack." In contrast, in the KB, there may be a direct link between the composer and the film. To mitigate such issues, the question to logic module 414 generates an initial logical interpretation of the query and looks for alternative AMR variables to correspond to entity linking results, in order to minimize the number of unbound variables (and maximize the use of entity linking results) in the final logical representation.

The logical expression $\hat{L}$ logic representation may then be finalized into a SPARQL query, which can be used to query the knowledge base 420. There exists a one-to-one mapping from constructs in the logical expression $\hat{L}$ to constructs in SPARQL. The question to logic module 414 converts the logical expression $\hat{L}$ into SPARQL constructs using rule-based transformation and then outputs a SPARQL query to the d module 416.

The logic correction module 416 performs an iterative process of knowledge graph queries to try to find a maximum correctness score for the assertion under evaluation. For each iteration, a query response is compared to the initial answer from the QA pair module 412 and a confidence score is generated based on a degree of similarity between the query response and the initial answer. If the confidence score is below a threshold requirement, the logic correction module 416 modifies the query used for the preceding iteration based on the comparison of the query response to the initial answer. The altered query will be used for a subsequent iteration. In some embodiments, the iterations continue until a threshold degree of similarity is detected or a predetermined number of iterations have been completed. If the threshold similarity value is not achieved, the fact checking system 400 alerts the user device 424 that the assertion appears to be false. If the threshold similarity value is achieved, the fact checking system 400 alerts the user device 424 that the assertion appears to be true.

Figure 5:
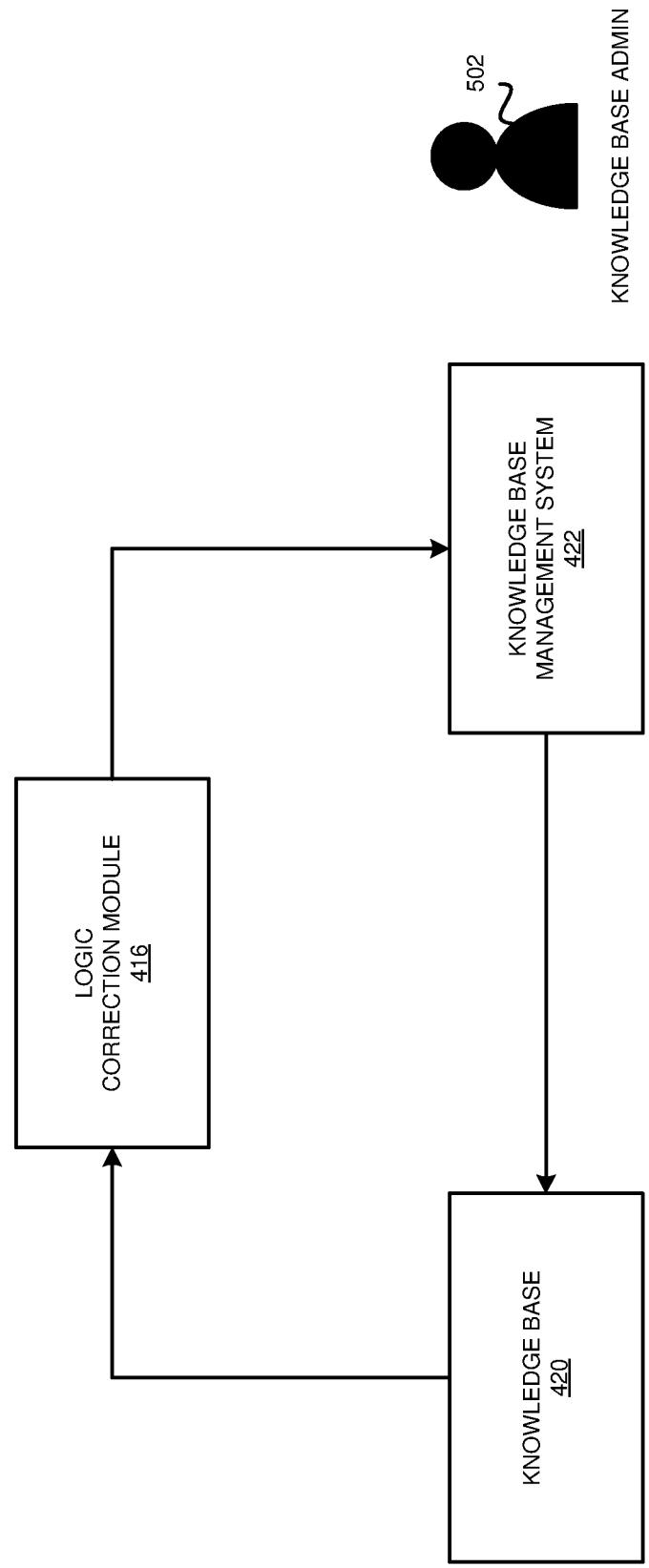
FIG. 5 depicts a functional block diagram of a knowledge graph correction process in accordance with an illustrative embodiment.

With reference to FIG. 5, this figure depicts a functional block diagram of a knowledge base correction process 500 in accordance with an illustrative embodiment. In a particular embodiment, the knowledge base correction process 500 is performed a knowledge base administrator 502 upon seeing a false negative or false positive result from the fact checking system 400 of FIG. 4. In such instances, the knowledge base administrator 502 may be testing the knowledge base 420 or noticed a result output from the logic correction module 416 that is clearly incorrect. This can happen, for example, due to a lack of relevant information in the knowledge base 420 and/or due to the presence of noise in the knowledge base 420.

The knowledge base management system 422 provides the administrator with the capability to correct the knowledge base. In the case of noise, the administrator 502 can review the queries made to the knowledge base 420, which will help the administrator 502 quickly identify problematic edges in the knowledge base 420. In the case of a lack of relevant information in the knowledge base 420, the administrator 502 can add the new fact to the knowledge base 420.

Figure 6:
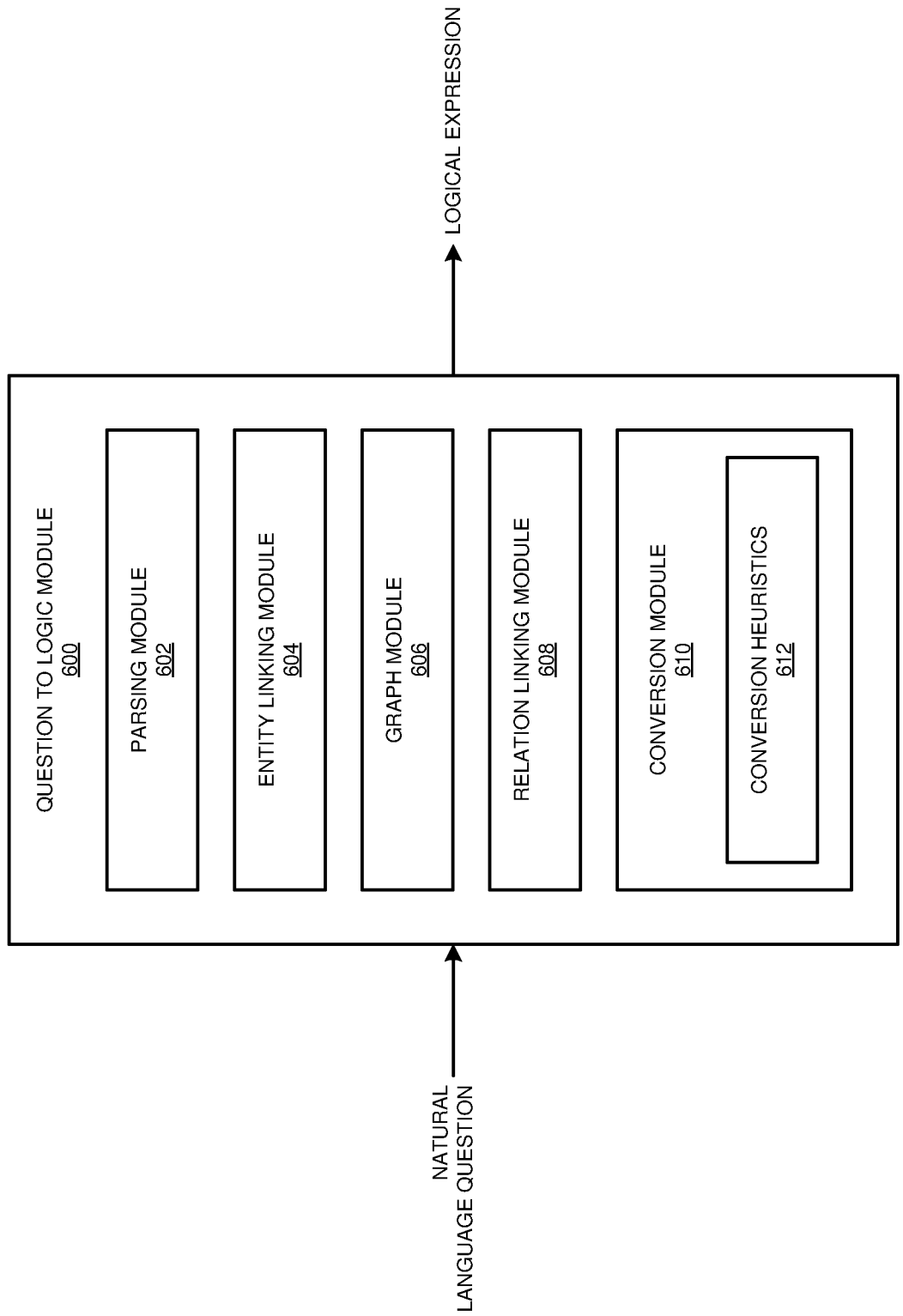
FIG. 6 depicts a block diagram of a question to logic module in accordance with an illustrative embodiment.

With reference to FIG. 6, this figure depicts a block diagram of a question to logic module 600 in accordance with an illustrative embodiment. In a particular embodiment, the question to logic module 600 is an example of the question to logic module 414 of FIG. 4.

In some embodiments, the question to logic module 600 includes a parsing module 602, entity linking module 604, graph module 606, relation linking module 608, conversion module 610, conversion heuristics 612. In alternative embodiments, the question to logic module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The question to logic module 600 represents an alternative embodiment in which the parsing and linking are performed in the question to logic module rather than in an ERDL module as described in connection with FIGS. 4 and 8. Thus, the parsing module 602 receives a natural language assertion and parses the assertion, which is then assembled into an AMR graph by the graph module 606 as described in connection with ERDL module 410 of FIG. 4 and ERDL module 802 of FIG. 8. The entity linking module 604 performs Entity Extraction and Linking, and the relation linking module 608 performs Relationship Extraction and Linking as described in connection with ERDL module 410 of FIG. 4 and ERDL module 802 of FIG. 8. The conversion module 610 then performs the generation of the logical expression using rule-based transformation as described in connection with the question to logic module 806 of FIG. 8.

Figure 7:
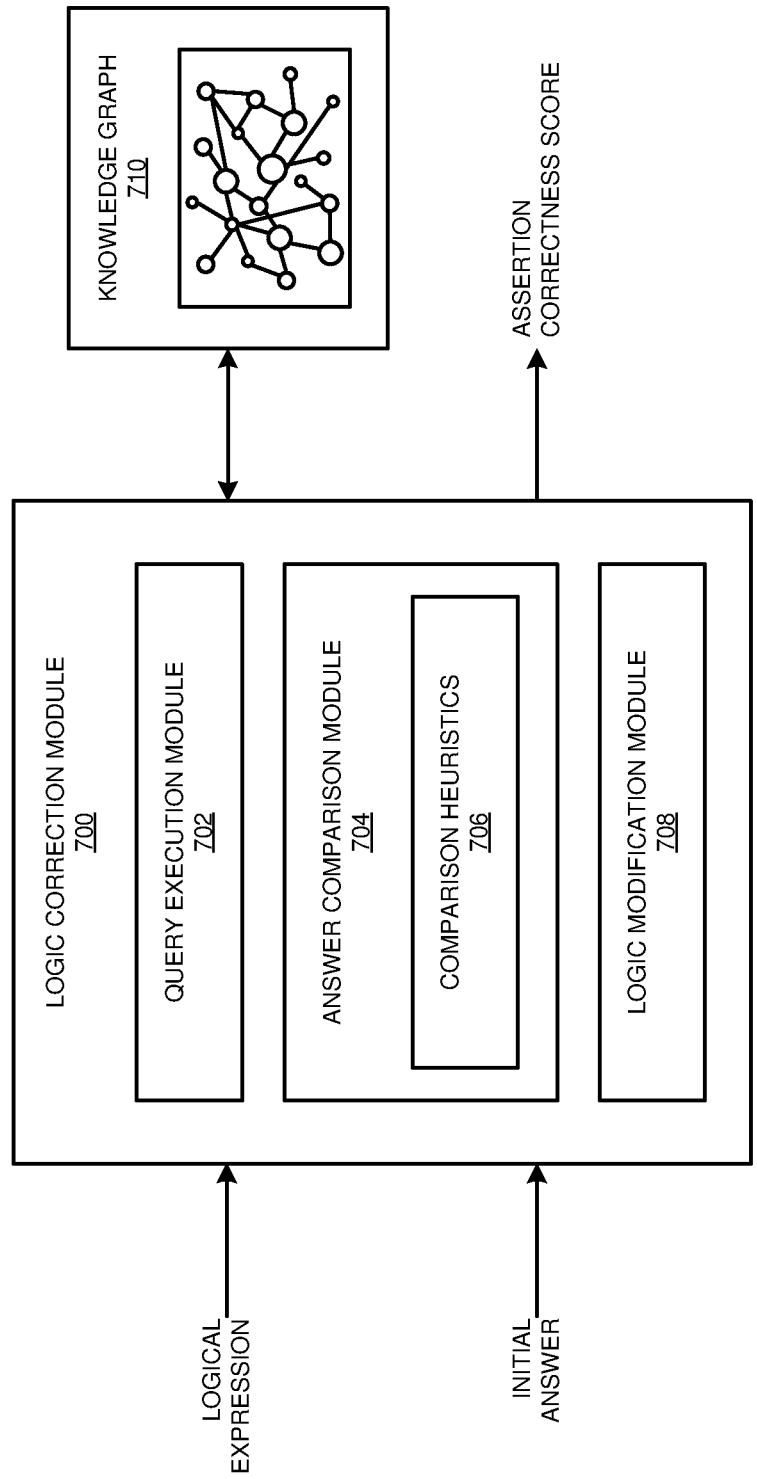
FIG. 7 depicts a block diagram of an example logic correction module in accordance with an illustrative embodiment.

With reference to FIG. 7, this figure depicts a block diagram of an example logic correction module 700 in accordance with an illustrative embodiment. In a particular embodiment, the logic correction module 700 is an example of the logic correction module 416 of FIG. 4.

In the illustrated embodiment, the logic correction module 700 includes a query execution module 702 in communication with a knowledge graph 710, an answer comparison module 704 that operates according to comparison heuristics 706, and logic modification module 708. In alternative embodiments, the logic correction module 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The logic correction module 700 performs an iterative process of knowledge graph queries to try to find a maximum correctness score for the assertion under evaluation. For each iteration, query execution module 702 issues a query to the knowledge graph 710. The answer comparison module 704 receives the query response from the knowledge graph 710 and compares the query response to the initial answer. In some embodiments, the answer comparison module 704 operates according to comparison heuristics 706. In some embodiments, the comparison heuristics 706 direct the answer comparison module 704 to determine if the query response is equal to the predicted answer. If so, the claim is designated as TRUE. Otherwise, if not, the answer comparison module 704 determines if the query response is a subset of the predicted answer. If so, the logic modification module 708 should remove a constraint from the query for a next iteration. If not, the answer comparison module 704 determines if the query response is a superset of the predicted answer. If so, the logic modification module 708 should add a new constraint to the query for a next iteration. If not, the answer comparison module 704 deduces that the union between the query response and the predicted answer is an empty set, so the logic modification module 708 should add a new constraint to the query and/or remove a constraint from the query for a next iteration.

Figure 8:
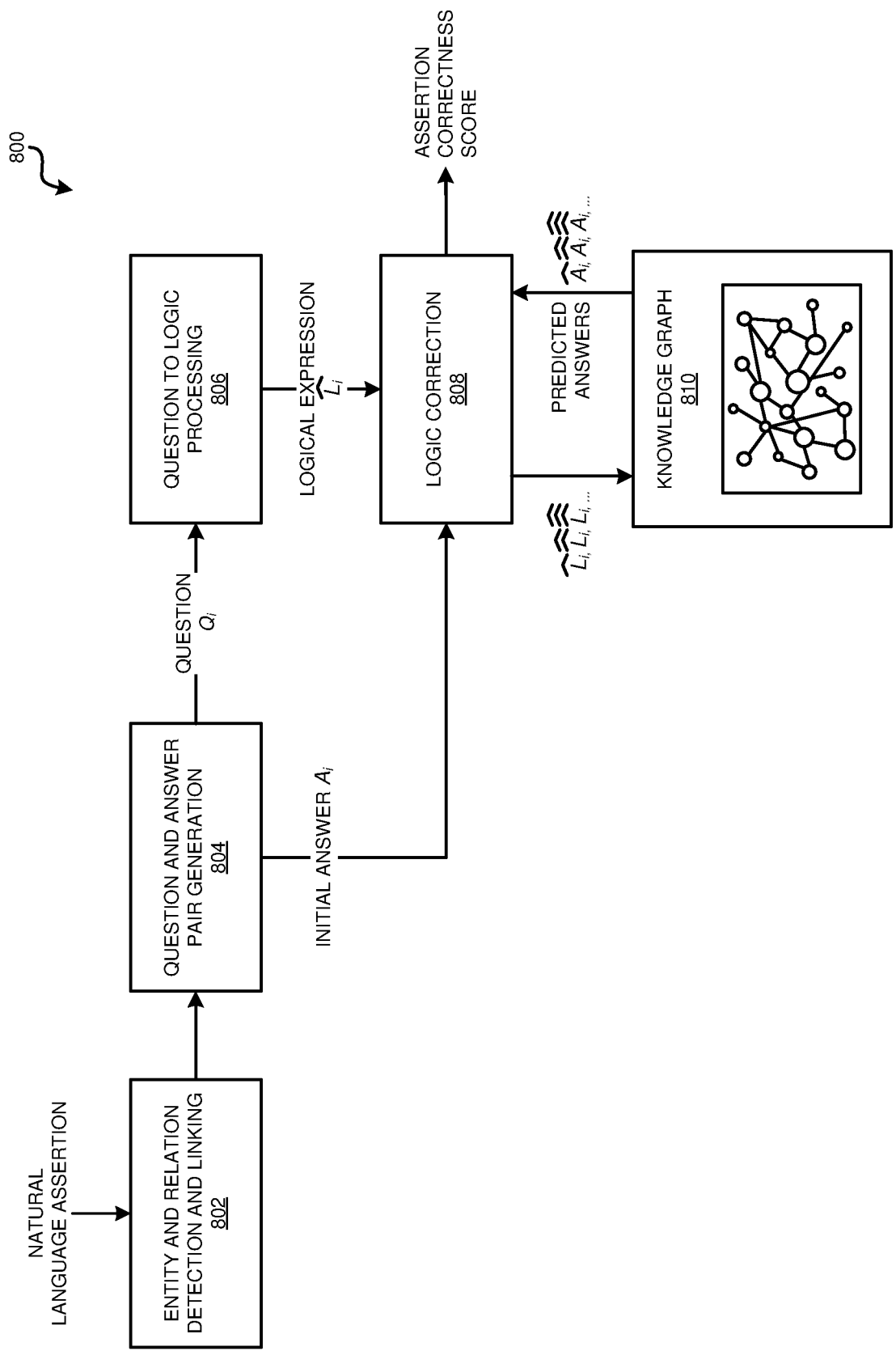
FIG. 8 depicts a functional block diagram of an automatic fact checking system in accordance with an illustrative embodiment.

With reference to FIG. 8, this figure depicts a functional block diagram of an automatic fact checking system 800 in accordance with an illustrative embodiment. In a particular embodiment, the automatic fact checking system 800 is an example of the automatic fact checking system 400 of FIG. 4.

In the illustrated embodiment, the fact checking system 800 includes an Entity and Relation Detection and Linking (ERDL) module 802, a Question and Answer (QA) pair module 804, a question to logic processing module 806, and a logic correction module 808, and a knowledge graph 810. In alternative embodiments, the fact checking system 800 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The input to the automatic fact checking system 800 is a natural language assertion, for example as a document data object of an electronic document. In some such embodiments, the document data object is a natural language text data object comprising a portion of natural language textual content of the electronic document.

In the illustrated embodiment, the inputted natural language assertion is first processed by the ERDL module 802. In some embodiments, the assertion is first parsed by the ERDL module 802 to identify concepts and relationships between the concepts. In some embodiments, the ERDL module 802 uses an Abstract Meaning Representation (AMR) parser. The AMR is a rooted, directed, acyclic graph (DAG) expressing, for example, "who is doing what to whom" in a sentence. Each node in the graph represents a concept whereas edges represent relations between concepts. Typical examples of edges are subject or object relations between concepts. An example input assertion text is "Dan Gauthier, Nichelle Nichols, Tom Towles, Walter Koenig, Rickey Medlocke and Amy Acker have acted in movies directed by William Shatner." The output of the parser, i.e., an AMR DAG for the assertion, contains entities and frames (relationships), though these may not be mapped/linked to corresponding structures in the knowledge graph 810.

Therefore, the ERDL module 802 is configured to perform Entity Extraction and Linking and Relationship Extraction and Linking. The Entity Extraction and Linking of the ERDL module 802 is configured to extract the entities and relationships to enrich the semantic representation obtained via AMR parsing with explicit links to entities and concepts that appear in the knowledge graph 810. The Relationship Extraction and Linking of the ERDL module 802 links those entities and relationships to the knowledge graph 810. The linked entities and relationships are then mapped to their corresponding nodes in AMR. The output of the ERDL module 802 is an Extended AMR graph that (E-AMR) that has both entities and relationships linked to the knowledge graph 810.

In some embodiments, for each candidate entity, the knowledge graph 810 identifies a subset of potential matching entities (either ontology classes or resources) for the candidate entities. Then, matching rules are applied to identify higher-precision matches. In some embodiments, the matching rules are based on combinations of features built from: the input assertion itself (e.g., entity name, co-occurring entities), knowledge graph 810 candidate entities (e.g., entity name and aliases, properties), and semantic similarity of the assertion and the knowledge graph subgraph of the candidate matching entity in a common vector space.

In some embodiments, with respect to relationship extraction and linking of the ERDL module 802, tasks are implemented to enrich the AMR representation by linking the frames and edges in the graph to their corresponding (semantically equivalent) relations in the knowledge graph 810. When mapping AMR predicates to knowledge graph 810 relations, a parallel corpus is created, e.g., using a subset of Wikipedia sentences. For each sentence, AMR graphs are generated, and a knowledge graph 810 triple is extracted in a weakly supervised manner. Mappings are then generated using a method inspired by Statistical Machine Translation. Furthermore, the surrounding context of the entity and relation mentions in the assertion can help in identifying the corresponding knowledge graph elements. To utilize these contextual clues, a unigram language models approach is adopted and context models built for each relationship predicate. For each predicate in the knowledge base 810, all the sentences are extracted from the underlying text corpus that mention instances of the predicate and unigram language models built which are then used to calculate the probability of a predicate being mentioned in the assertion. The top-N relationships (e.g., N=5) based on these probabilities are then selected as the output of ERDL module 802.

In the illustrated embodiment, the AMR graph is next modified by the QA pair generation module 804. The QA pair generation module 804 seeks to translate the assertion into a question and an answer. The QA pair generation module 804 first modifies the AMR graph of the assertion to isolate a concept and replace the other(s) with an "amr-unknown" as is used for the unknown answer when generating an AMR graph for a question. The modified AMR graph can then be translated into a question from the AMR graph. For example, beginning with the assertion "Dan Gauthier, Nichelle Nichols, Tom Towles, Walter Koenig, Rickey Medlocke, and Amy Acker have acted in movies directed by William Shatner," an AMR graph includes nodes for Dan Gauthier, Nichelle Nichols, Tom Towles, Walter Koenig, Rickey Medlocke, Amy Acker, movies, and William Shatner. The AMR graph is then modified to replace Dan Gauthier, Nichelle Nichols, Tom Towles, Walter Koenig, Rickey Medlocke, and Amy Acker with "amr-unknown." The resulting modified AMR graph can then be converted to a question such as "Q: Who all are the actors starring in movies directed by William Shatner?" Then, the removed nodes become an initial answer "A: Dan Gauthier, Nichelle Nichols, Tom Towles, Walter Koenig Rickey Medlocke, Amy Acker." The question is output to the question to logic module 806 and the answer is output to the logic correction module 808.

The question to logic module 806 then transforms the question to a logical expression $\hat{L}_i$. In some embodiments, the logical expression $\hat{L}_i$ is a SPARQL query. For example, the example question from can result in the following SPARQL query:

```
SELECT DISTINCT ?p
WHERE
{ ?m dbo:director res:William_Shatner
  ?m dbo:starring ?p
}
```

In an embodiment, a logical formalism for this task is used to create a bridge between AMR and SPARQL that can represent both declarative and procedural knowledge. The formalism supports binary predicates, which are ubiquitous in linked open data, and higher-order functional predicates to support aggregation and manipulation of sets of variable bindings. This formalism is not restricted to the SPARQL query language. It follows the same syntactic patterns as the OpenCyc and NextKB projects, enabling support for a broad range of semantics, from standard logical operators to DBpedia predicates and functions that emulate SPARQL constructs.

AMR works remarkably well at identifying verb senses and semantic roles. This provides a significant foundation for a rule-based transformation from AMR to logic. In an implementation, the following issues are addressed: 1) identifying the target (unbound) variable of a query, 2) identifying queries that require sorting sets of variable bindings, and 3) resolving KB entity URIs to AMR variables.

AMR representations for interrogative and imperative statements are used to identify target variables. In AMR, interrogative statements are represented with nodes that belong to an amr-unknown class. Intuitively, if a question were translated into a fill-in-the-blank sentence, the blank would be represented with an instance of the amr-unknown class. In such cases, the question to logic module 806 replaces amr-unknown nodes (or neighboring nodes) with unbound variables. For imperative statements, the AMR to logic translator replaces the direct object role (ARG1) of the top-level command with an unbound variable.

Questions that require sorting can be detected by the presence of superlatives (i.e., AMR most and least classes) and quantity Propbank frames (i.e., have-quant-91, have-degree-91). The question to logic module 806 must determine the AMR variable that corresponds to the quantity of interest and sorting direction (ascending for "least" and descending for "most"). Entity and relation linking results are essential inputs to the question to logic module 806 because they provide the required KB-specific vocabulary. However, even with accurate entity and relation linking results, there may be differences in the granularity of entities and relations in the KB and AMR representation. For instance, an acceptable AMR parse for "the composer of the soundtrack for Titanic" might not have an edge that directly connects "composer" to "Titanic," but rather a two-edge path between them that passes through "soundtrack." In contrast, in the KB, there may be a direct link between the composer and the film. To mitigate such issues, the question to logic module 806 generates an initial logical interpretation of the query and looks for alternative AMR variables to correspond to entity linking results, in order to minimize the number of unbound variables (and maximize the use of entity linking results) in the final logical representation.

The logical expression $\hat{L}$ logic representation may then be finalized into a SPARQL query, which can be used to query the knowledge graph 810. There exists a one-to-one mapping from constructs in the logical expression $\hat{L}$ to constructs in SPARQL. The question to logic module 806 converts the logical expression $\hat{L}$ into SPARQL constructs using rule-based transformation and then outputs a SPARQL query to the logic correction module 808.

Figure 9:
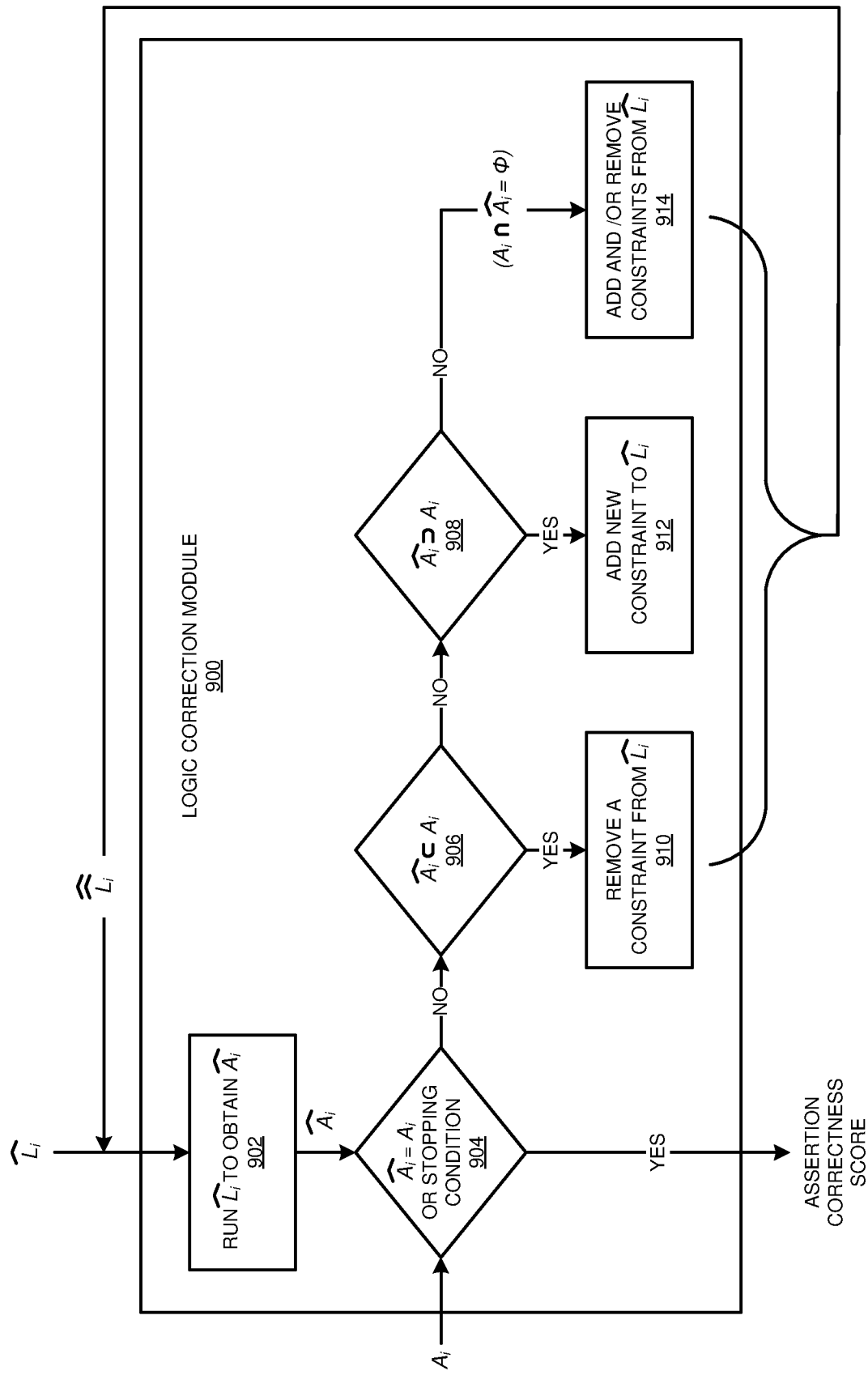
FIG. 9 depicts a functional block diagram of a logic correction module in accordance with an illustrative embodiment.

With reference to FIG. 9, this figure depicts a functional block diagram of a logic correction module 900 in accordance with an illustrative embodiment. In a particular embodiment, the logic correction module 900 is an example of the logic correction module 700 of FIG. 7.

The logic correction module 900 performs an iterative process of knowledge graph queries to try to find a maximum correctness score for the assertion under evaluation. In the illustrated embodiment, at block 902, or each iteration, logic correction module 900 issues a query to a knowledge graph (e.g., knowledge graph 710 of FIG. 7). The logic correction module 900 receives the query response from the knowledge graph and compares the query response to the initial answer. In some embodiments, the logic correction module 900 operates according to comparison heuristics represented by blocks 904-914. In some embodiments, at block 904, the logic correction module 900 determines if the query response is equal to the initial answer. If so, the claim is designated as TRUE. Otherwise, if not, at block 906, the logic correction module 900 determines if the query response is a subset of the initial answer. If so, at block 910, the logic correction module 900 removes a constraint from the query for a next iteration. If not, then at block 908, the logic correction module 900 determines if the query response is a superset of the initial answer. If so, then at block 912, the logic correction module 900 adds a new constraint to the query for a next iteration. If not, then the logic correction module 900 deduces that the union between the query response and the initial answer is an empty set, so the logic correction module 900 adds a new constraint to the query and/or removes a constraint from the query for a next iteration.

Figure 10:
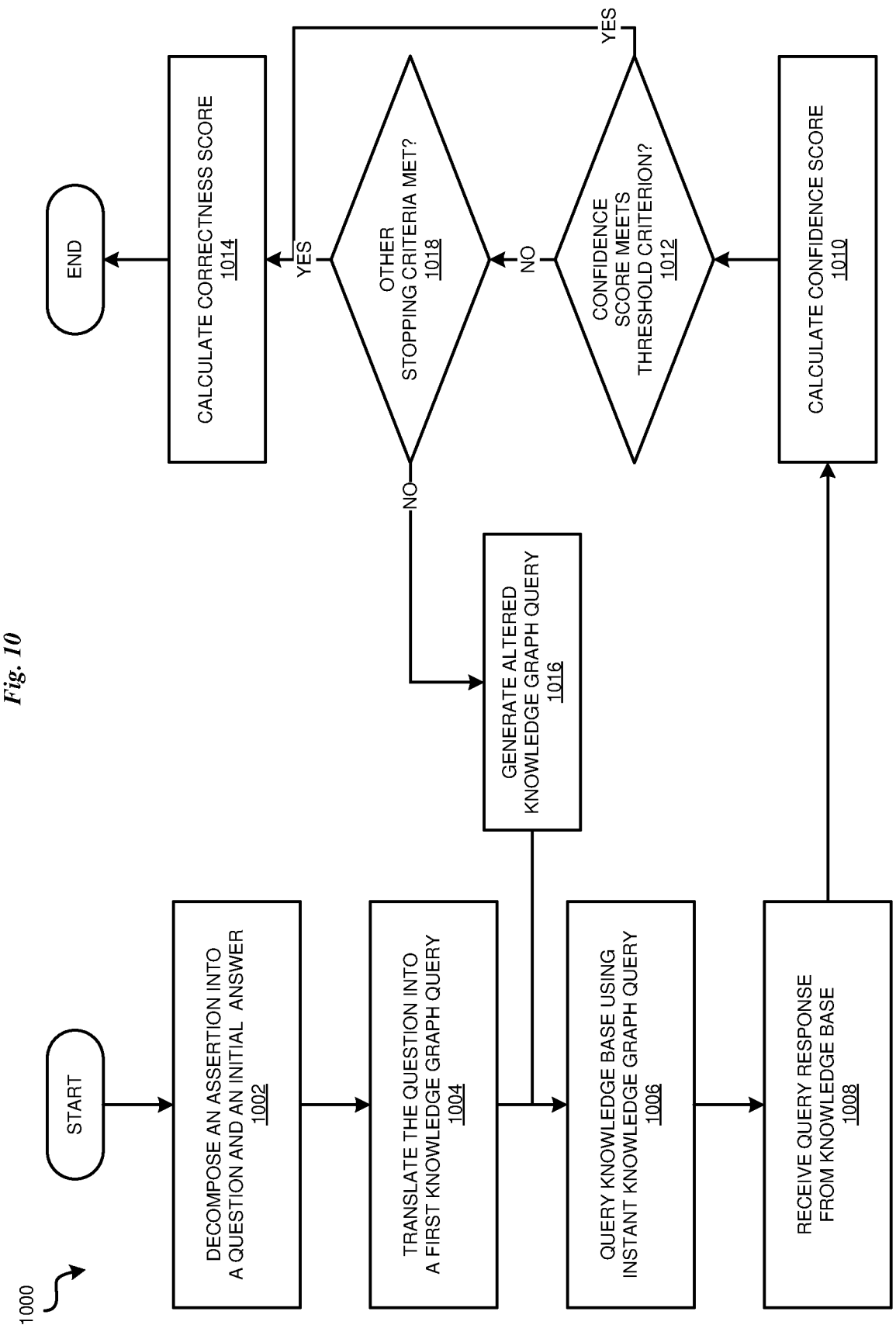
FIG. 10 depicts a flowchart of an example process for automatic fact checking in accordance with an illustrative embodiment.

With reference to FIG. 10, this figure depicts a flowchart of an example process 1000 for automatic fact checking in accordance with an illustrative embodiment. In a particular embodiment, the fact checking system 400 of FIG. 4 carries out the process 1000.

In an embodiment, at block 1002, the process decomposes a natural language assertion into a natural language question and a natural language answer. In some embodiments, the process comprises decomposing the natural language assertion by parsing the natural language assertion into an Abstract Meaning Representation (AMR) graph. In some such embodiments, process then deletes one or more nodes of the AMR graph and replaces the deleted node(s) with an "amr-unknown" node. The process then converts the AMR graph with the amr-unknown node into the natural language question and converts the deleted node(s) into the natural language answer.

Next, at block 1004, the process translates the natural language question from block 1002 into a first knowledge graph query. Next, at block 1006, the process queries a knowledge graph using an instant knowledge graph query from block 1004. Next, at block 1008, the process receives a query response from the knowledge graph.

Next, at block 1010, the process calculates a confidence score. In some embodiments, the process calculates the confidence score based on a comparison of the query response from block 1008 to the natural language answer from block 1002. Next, at block 1012, the process determines whether the confidence score meets a threshold criterion. Next, at block 1014, if the threshold criterion is met, the process calculates a correctness score and then ends. Otherwise, if the threshold criterion is not met at block 1012, the process proceeds to block 1016. At block 1016, the process determines whether any other stopping criteria has been met. If so, the process continues to block 1014 as described above. Otherwise, the process continues to block 1018.

At block 1018, the process generates an altered knowledge graph query, then returns to block 1006 for another iteration using the altered knowledge graph query. In some embodiments, the process determines an alteration based on a comparison result from the comparison at block 1010 of the query response to the natural language answer. In some such embodiments, if the comparison result indicates that the query response is a subset of the natural language answer, the process generates the altered knowledge graph query by removing a constraint from the knowledge graph query used to query the knowledge graph at block 1006. In some such embodiments, if the comparison result indicates that the query response is a superset of the natural language answer, the process generates the altered knowledge graph query by adding a new constraint to the knowledge graph query used to query the knowledge graph at block 1006. In some such embodiments, if the comparison result indicates that a union between the query response and the natural language answer is an empty set, the process generates the altered knowledge graph query by removing a constraint from, and adding a new constraint to, the knowledge graph query used to query the knowledge graph at block 1006.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
decomposing a natural language assertion into a natural language question and answer pair, the natural language question and answer pair comprising an initial question and an initial answer;
translating the initial question into a structured knowledge graph query;
performing an iterative process comprising iterative querying of a knowledge graph and evaluating of corresponding query responses resulting in respective confidence scores,
wherein a first iteration of the iterative process comprises:
querying of the knowledge graph by executing, as a first predicted query, the structured knowledge graph query to retrieve a first predicted answer as a query response from the knowledge graph;
determining whether a first confidence score of the respective confidence scores meets a threshold criterion, wherein the first confidence score is indicative of a degree of similarity between the initial answer and the first predicted answer; and
altering, responsive to the first confidence score failing to meet the threshold criterion, the first predicted query based on a difference between the initial answer and the first predicted answer, wherein the altering results in an altered predicted query;
wherein subsequent iterations of the iterative process comprise querying of the knowledge graph using respective altered predicted queries; and
generating an assertion correctness score using the respective confidence scores, wherein the assertion correctness score is indicative of a degree of confidence that the assertion is factual.

2. The method of claim 1, wherein the decomposing of the natural language assertion comprises parsing the natural language assertion into an Abstract Meaning Representation (AMR) graph.

3. The method of claim 2, wherein the decomposing of the natural language assertion further comprises deleting a node of the AMR graph and replacing the thus deleted node with an amr-unknown node.

4. The method of claim 3, wherein the decomposing of the natural language assertion further comprises converting the AMR graph with the amr-unknown node into the initial question.

5. The method of claim 4, wherein the decomposing of the natural language assertion further comprises converting the deleted node into the initial answer.

6. The method of claim 1, wherein the iterative process comprises designating the assertion as true if the predicted answer is equal to the initial answer.

7. The method of claim 1, wherein the iterative process comprises determining that the query response is a subset of the initial answer.

8. The method of claim 7, wherein the iterative process comprises removing, responsive to determining that the query response is a subset of the initial answer, a constraint from the first predicted query for a next iteration.

9. The method of claim 1, wherein the iterative process comprises determining that the query response is a superset of the initial answer.

10. The method of claim 9, wherein the iterative process comprises adding, responsive to determining that the query response is a subset of the initial answer, a constraint to the first predicted query for a next iteration.

11. The method of claim 1, wherein the iterative process comprises determining that a union between the query response and the initial answer is an empty set.

12. The method of claim 11, wherein the iterative process comprises adding a constraint to and removing a constraint from the first predicted query in response to determining that a union between the query response and the initial answer is an empty set.

13. A computer program product, the computer program product comprising one or more computer readable storage media, and program instructions collectively stored on the one or more computer readable storage media, the program instructions executable by one or more processors to cause the one or more processors to perform operations comprising:
decomposing a natural language assertion into a natural language question and answer pair, the natural language question and answer pair comprising an initial question and an initial answer;
translating the initial question into a structured knowledge graph query;
performing an iterative process comprising iterative querying of a knowledge graph and evaluating of corresponding query responses resulting in respective confidence scores,
wherein a first iteration of the iterative process comprises:
querying of the knowledge graph by executing, as a first predicted query, the structured knowledge graph query to retrieve a first predicted answer as a query response from the knowledge graph;
determining whether a first confidence score of the respective confidence scores meets a threshold criterion, wherein the first confidence score is indicative of a degree of similarity between the initial answer and the first predicted answer; and
altering, responsive to the first confidence score failing to meet the threshold criterion, the first predicted query based on a difference between the initial answer and the first predicted answer, wherein the altering results in an altered predicted query;
wherein subsequent iterations of the iterative process comprise querying of the knowledge graph using respective altered predicted queries; and
generating an assertion correctness score using the respective confidence scores, wherein the assertion correctness score is indicative of a degree of confidence that the assertion is factual.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

16. The computer program product of claim 13, wherein the decomposing of the natural language assertion comprises parsing the natural language assertion into an Abstract Meaning Representation (AMR) graph.

17. The computer program product of claim 16, wherein the decomposing of the natural language assertion further comprises deleting a node of the AMR graph and replacing the thus deleted node with an amr-unknown node.

18. A computer system comprising one or more processors and one or more computer readable storage media, and program instructions collectively stored on the one or more computer readable storage media, the program instructions executable by the one or more processors to cause the one or more processors to perform operations comprising:
decomposing a natural language assertion into a natural language question and answer pair, the natural language question and answer pair comprising an initial question and an initial answer;
translating the initial question into a structured knowledge graph query;
performing an iterative process comprising iterative querying of a knowledge graph and evaluating of corresponding query responses resulting in respective confidence scores,
wherein a first iteration of the iterative process comprises:
querying of the knowledge graph by executing, as a first predicted query, the structured knowledge graph query to retrieve a first predicted answer as a query response from the knowledge graph;
determining whether a first confidence score of the respective confidence scores meets a threshold criterion, wherein the first confidence score is indicative of a degree of similarity between the initial answer and the first predicted answer; and
altering, responsive to the first confidence score failing to meet the threshold criterion, the first predicted query based on a difference between the initial answer and the first predicted answer, wherein the altering results in an altered predicted query;

wherein subsequent iterations of the iterative process comprise querying of the knowledge graph using respective altered predicted queries; and generating an assertion correctness score using the respective confidence scores, wherein the assertion correctness score is indicative of a degree of confidence that the assertion is factual.

19. The computer system of claim 18, wherein the decomposing of the natural language assertion comprises parsing the natural language assertion into an Abstract Meaning Representation (AMR) graph.

20. The computer system of claim 19, wherein the decomposing of the natural language assertion further comprises deleting a node of the AMR graph and replacing the thus deleted node with an amr-unknown node.

* * * * *